United States Patent
Zhou et al.

(10) Patent No.: US 7,554,939 B2
(45) Date of Patent: Jun. 30, 2009

(54) HANDLING SPECIALIZED RESOURCE FUNCTIONS ASSOCIATED WITH WIRELESS INTELLIGENT NETWORK IN MOBILE SWITCH CENTER

(75) Inventors: Yi Zhou, Lisle, IL (US); Jean Chang, Ames, IA (US); Frances Mu-Fen Chin, Naperville, IL (US); Seongwoon Kim, Napereville, IL (US); Ismael Lopez, Jr., Berwyn, IL (US); Yu Yin, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1027 days.

(21) Appl. No.: 10/383,271

(22) Filed: Mar. 7, 2003

(65) Prior Publication Data

US 2004/0174837 A1 Sep. 9, 2004

(51) Int. Cl.
*H04Q 7/00* (2006.01)
*H04Q 7/20* (2006.01)

(52) U.S. Cl. .............. 370/328; 455/433; 455/445; 379/207.02; 379/207.04

(58) Field of Classification Search .......... 455/432.1, 455/433, 418, 435.1, 445, 432.3, 432.2, 461, 455/414.4, 414.1, 413; 370/328, 338, 238, 370/277; 379/207.02, 207.04, 221.12, 221.08
See application file for complete search history.

(56) References Cited

U.S. PATENT DOCUMENTS

| | | | | |
|---|---|---|---|---|
| 6,044,264 A | * | 3/2000 | Huotari et al. ........... 455/414.1 |
| 6,101,387 A | * | 8/2000 | Granberg et al. ............ 455/433 |
| 6,226,373 B1 | * | 5/2001 | Zhu et al. ............... 379/207.02 |
| 6,256,512 B1 | * | 7/2001 | Verdonk ................. 455/554.1 |
| 6,373,930 B1 | * | 4/2002 | McConnell et al. ..... 379/114.28 |
| 6,393,269 B1 | * | 5/2002 | Hartmaier et al. ........... 455/406 |
| 6,434,126 B1 | * | 8/2002 | Park ........................... 370/328 |
| 6,496,691 B1 | * | 12/2002 | Easley et al. ................ 455/415 |
| 6,519,232 B1 | * | 2/2003 | Becher ........................ 370/314 |
| 6,711,156 B1 | * | 3/2004 | Gourraud .................... 370/352 |
| 6,975,855 B1 | * | 12/2005 | Wallenius ................... 455/417 |
| 7,006,825 B2 | * | 2/2006 | Tornkvist ................. 455/432.1 |
| 2001/0053158 A1 | | 12/2001 | Cai et al. ..................... 370/467 |
| 2002/0103762 A1 | * | 8/2002 | Lopez et al. ................... 705/63 |

OTHER PUBLICATIONS

*TIA/EIA/IS-826*, Wireless Intelligent Network; Capabilities for Pre-Paid Charging; Telecommunications Industry Association; Chapter 4, 8.x.3, 8.x.5, 8.x.10, 8.x.11, 8.x.16; Jun. 2000.

(Continued)

*Primary Examiner*—George Eng
*Assistant Examiner*—Brandon J Miller

(57) ABSTRACT

The invention implements specialized resource functions (SRFs) associated with wireless intelligent network (WIN) in a mobile switch center (MSC) of a wireless network. In one aspect, the invention provides a method for handling SRFs associated with WIN in an MSC of a wireless network. In another embodiment of the method, the invention provides a method for handling SRFs in an MSC of a wireless network, wherein the wireless network includes the MSC and a service control point (SCP) in communication with the MSC. In still another aspect, the invention provides an MSC for a wireless network that includes: a switch service function (SSF) process, an SRF process, an SSF/SRF interface, and an SCP interface.

13 Claims, 5 Drawing Sheets

OTHER PUBLICATIONS

*TIA/EIA/IS-771*, Wireless Intelligent Network, Telecommunications Industry Association; Chapter 4, 8.3.8.1, 8.3.8.2, 8.7.1, 8.7.2; Dec. 1998.

*TIA/EIA/IS-848*, Interim Standard, Telecommunications Industry Association; Chapter 4, 8.S.6, 8.S.7, 8.V.1, 8.V.2; Nov. 2000.

* cited by examiner

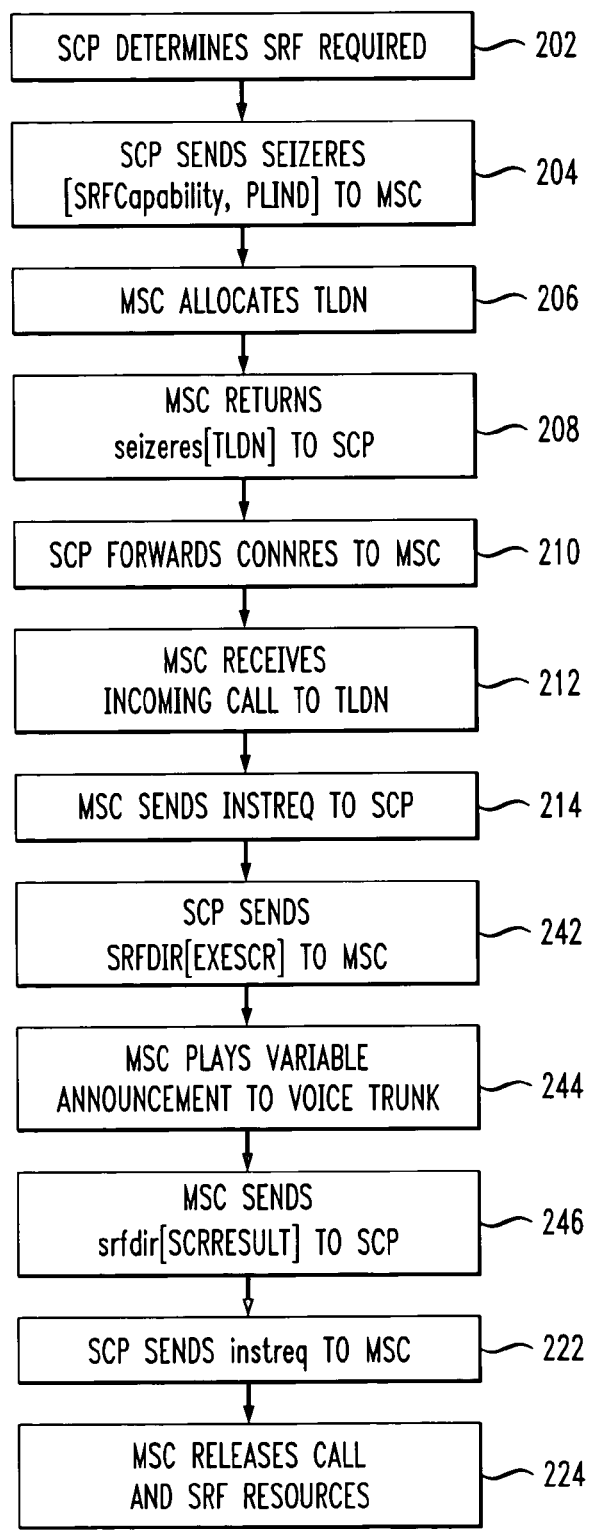

HANDLING SPECIALIZED RESOURCE FUNCTIONS ASSOCIATED WITH WIRELESS INTELLIGENT NETWORK IN MOBILE SWITCH CENTER

BACKGROUND OF INVENTION

The invention relates to implementation of specialized resource functions (SRFs) associated with wireless intelligent network (WIN). It finds particular application in conjunction with implementation of the SRFs in a mobile switch center (MSC) and will be described with particular reference thereto. However, it is to be appreciated that the invention is also amenable to other applications.

WIN capabilities are generally known in the art and specified in TIA/EIA/IS-771, Chapter 4, which is incorporated herein by reference. A wireless network model supporting WIN capabilities is shown in TIA/EIA/IS-771, Chapter 3, Section 5, which is incorporated herein by reference. FIG. 1 depicts previous wireless network infrastructure entities of the IS-771 wireless network model that are pertinent to the invention. As shown, the previous wireless network 10 includes a home location register (HLR) 12, a service control point (SCP) 14, an intelligent peripheral (IP) 16, a mobile switching center (MSC)/visitor location register (VLR) 18, and a remaining overall network 20 including further infrastructure entities and mobile stations (MSs).

In the previous wireless network 10, the functionalities of the most pertinent entities are as follows: the SCP 14 provides service control functions (SCFs), the MSC 18 provides service switch functions (SSFs), and the IP 16 provides specialized resource functions (SRFs). The SRFs provided by the IP 16 include playing announcements, collecting digits, performing speech-to-text or text-to-speech conversion, recording and storing voice messages, facsimile services, data services, etc. In order to perform SRFs, the IP 16 requires a signaling link 22 with the MSC 18, SCP 14, and the overall network 20. Additionally, a voice trunk 24 is required between the IP 16 and the MSC 18 and another voice trunk 24 is required between the IP 16 and the overall network 20.

There is a particular need in wireless networks to continuously reduce hardware entities, signaling links between hardware entities, and voice trunks between hardware entities to minimize cost and maximize performance. The invention contemplates implementation of SRFs associated with WIN in the MSC, thereby eliminating the IP, one or more signaling links associated with the IP, and one or more voice trunks associated with the IP. Accordingly, the invention overcomes at least one of the above-mentioned problems and others.

BRIEF SUMMARY OF INVENTION

In one aspect of the invention, a method for handling SRFs associated with WIN in an MSC of a wireless network is provided. The method includes: a) providing an SCP associated with the MSC, b) in the SCP, determining that an SRF is required, c) in the SCP, sending a seize resource (SEIZERES) invoke message to the MSC, and d) in the MSC, allocating a temporary local directory number (TLDN) for providing the SRF and sending a seize resource (seizeres) return result message to the SCP.

In another aspect of the invention, an MSC for a wireless network is provided. The MSC includes: a) means for providing SSFs, b) means for providing SRFs, c) means for interfacing between the SSF means and the SRF means, d) means for interfacing between the SRF means and an SCP associated with the MSC, and e) means for interfacing between the SRF means and the wireless network.

In still another aspect of the invention, a method for handling SRFs in an MSC of a wireless network is provided, wherein the wireless network includes the MSC and an SCP in communication with the MSC. The method includes: a) determining that an SRF is required, b) sending a seize resource (SEIZERES) invoke message from the SCP to the MSC, c) allocating a TLDN in the MSC for providing the SRF, and d) sending a seize resource (seizeres) return result message from the MSC to the SCP.

One advantage of invention is that an IP entity is no longer required in order to handle SRFs associated with WIN.

Another advantage of the invention is that less voice trunks are required when handling SRFs associated with WIN.

Yet another advantage of the invention is that less signaling links are required when handling SRFs associated with WIN.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

FIG. 6 is a call flowchart of an exemplary SRF scenario ("Play Variable Announcement According to Script") provided in an embodiment of the invention.

DETAILED DESCRIPTION

Figure 1:
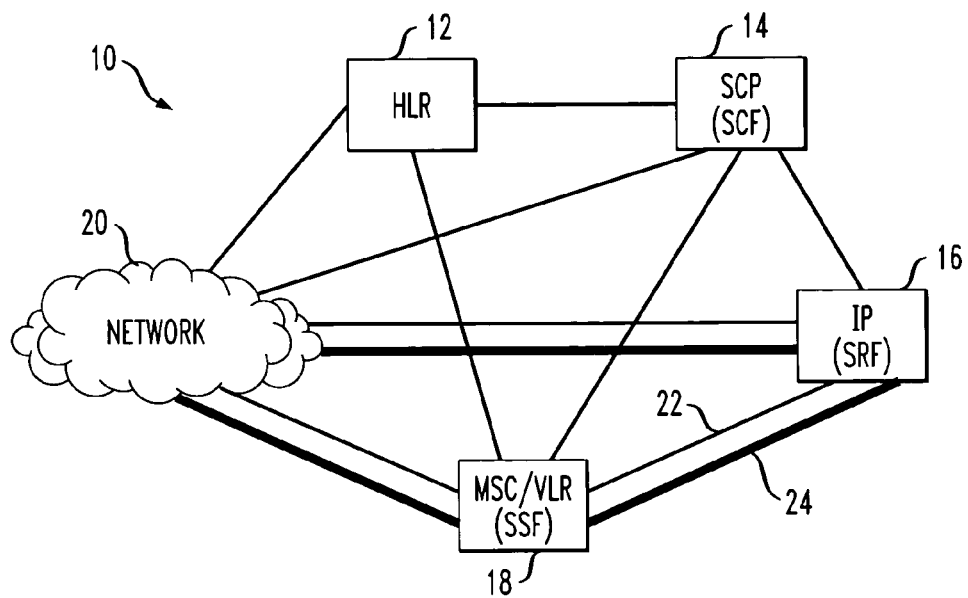
FIG. 1 is a block diagram of a previous wireless network providing SRFs.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

Figure 2:
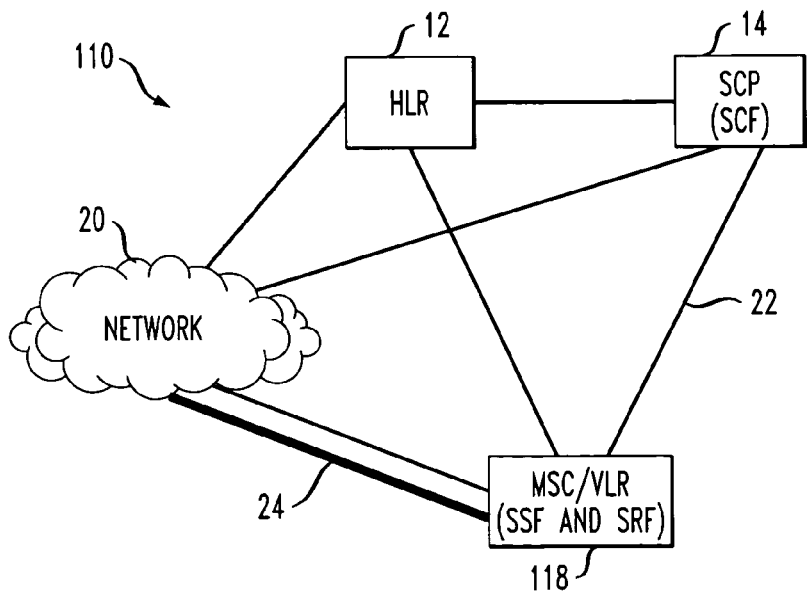
FIG. 2 is a block diagram of an embodiment of a wireless network incorporating the invention.

With reference to FIG. 2, an embodiment of a wireless network 110 incorporating the invention includes an HLR 12, an SCP 14, an MSC/VLR 118, and a remaining overall network 20 including further infrastructure entities and MSs. The SCP 14 provides SCFs while the MSC 118 provides SSFs and SRFs. The SRFs provided by the MSC 118 include playing announcements, collecting digits, performing speech-to-text or text-to-speech conversion, recording and storing voice messages, facsimile services, data services, etc. In order to perform SRFs, the MSC 118 requires a signaling link 22 with the SCP 14 and the overall network 20. Additionally, a voice trunk 24 is required between the MSC 118 and the overall network 20. Note that the network 110 does not require an IP 16 (FIG. 1) to provide SRFs because SRFs are implemented by the MSC 118.

Figure 3:
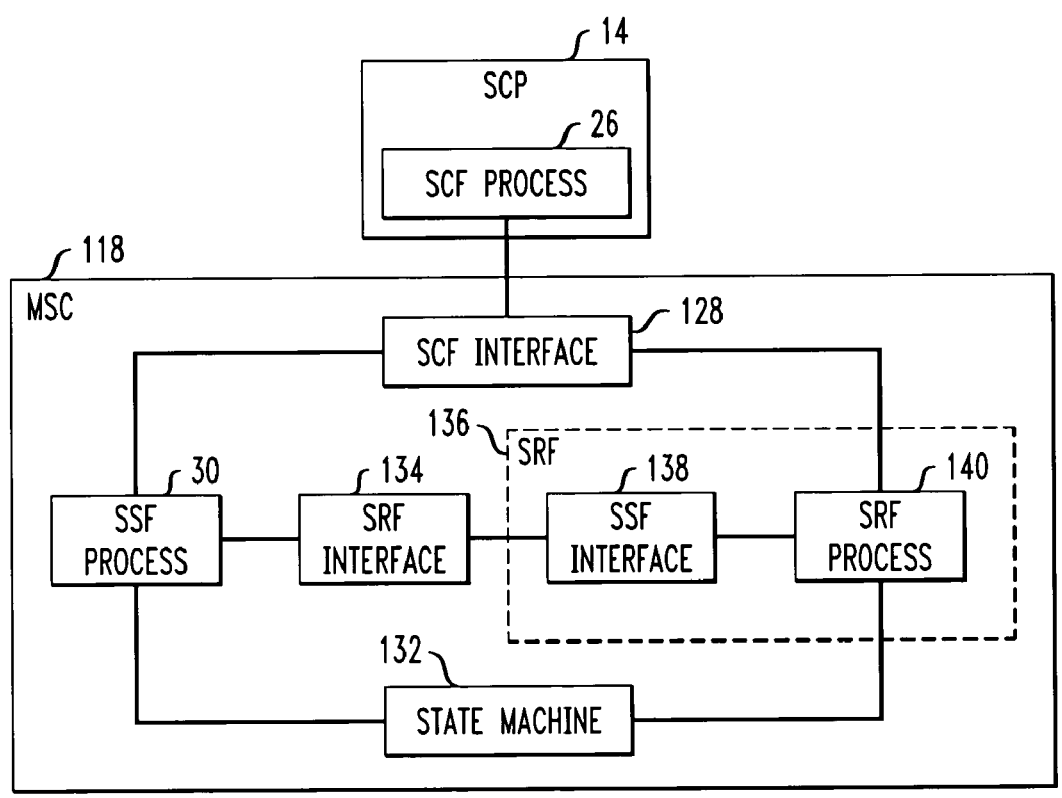
FIG. 3 is a block diagram of an embodiment of an MSC incorporating the invention along with an SCP.

With reference to FIG. 3, an embodiment of an MSC 118 incorporating the invention is shown along with an SCP 14. The SCP 14 includes an SCF process 26. The MSC 118 includes an SCF interface 128, an SSF process 30, a state machine 132, an SRF interface 134 and an SRF module 136. The SRF module 136 includes an SSF interface 138 and an SRF process 140. The SSF process 30 is in communication with the SCF process 26 via the SCF interface 128 and vice versa. Likewise, the SRF process 140 is in communication with the SCF process 26 via the SCF interface 128 and vice versa. Similarly, the SSF process 30 is in communication with the SRF process 140 via the SRF interface 134 and the SSF interface 136 and vice versa. The state machine 132 is in communication with both the SSF process 30 and the SRF process 140 to maintain a current status of calls being handled by the MSC 118. Typically, each process (e.g., 140) includes at least one processor and at least one memory in order to perform the function. Of course, the physical components of the MSC 118 may be arranged differently. For example, the SSF and SRF processes 30, 140 may be sub-processes of a common component. Moreover, processors and memory may be shared between various MSC processes.

Figure 4:
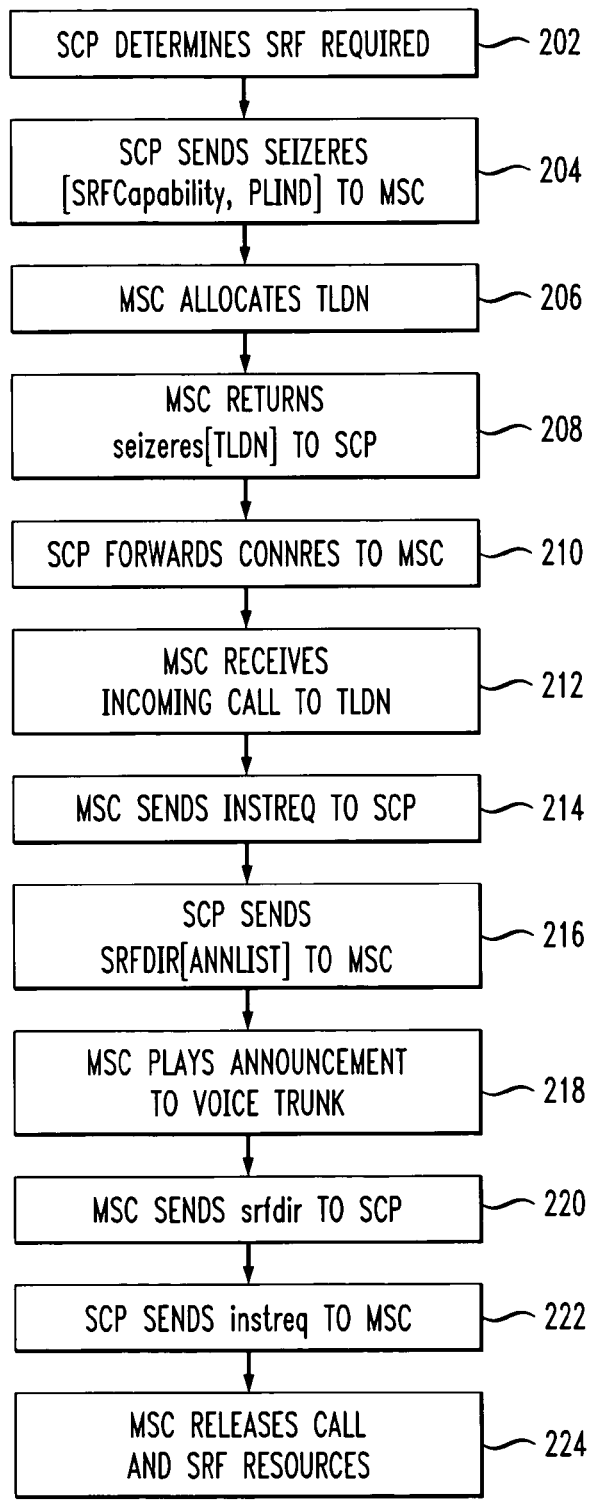
FIG. 4 is a call flowchart of an exemplary SRF scenario ("Play Announcement") provided in an embodiment of the invention.

With reference to FIG. 4, a call flow of an exemplary SRF scenario ("Play Announcement") 200 is provided. In general, the scenario begins after a call has been originated by a mobile subscriber (MS) and an associated MSC has communicated a request to the SCP associated with an incoming call. In step 202, the SCP determines that in order to handle the request from the MSC an SRF is required. Next, the SCP sends a SeizeResource (SEIZERES) invoke message to the MSC to request a resource (step 204). The SEIZERES invoke message may include SRFCapability and PreferredLanguageIndicator (PLIND) parameters. The SRFCapability parameter specifies the specialized resource capabilities requested (e.g., SpecializedResource, PrivateSpecializedResource). The PLIND parameter indicates the preferred language. After SEIZERES is received, the MSC allocates a temporary local directory number (TLDN) to an appropriate resource (step 206) and remembers the purpose of allocating this resource is to provide SRFs. In step 208, the MSC sends a seizeresource (seizeres) return result message to the SCP indicating that the SIEZERES request is complete. The seizeres return result message includes DestinationDigits (DSTDGTS) parameter indicating the allocated TLDN.

At this point, the SCP sends a ConnectResource (CONNRES) invoke message to the MSC with instructions to set up a call leg (step 210). The CONNRES invoke message includes the DSTDGTS parameter (e.g., TLDN) so that the MSC can set up the call leg to the allocated TLDN. At step 212, the MSC receives an incoming call to a TLDN. After the incoming call is detected, the MSC determines if the incoming call is to an allocated TLDN. If the call is to an allocated TLDN, the MSC determines the purpose for the allocation. If the call is not to an allocated TLDN, the incoming call is rejected by the MSC. When an incoming call is received to the TLDN allocated for SRF resources (as in this scenario), the MSC sends an InstructionRequest (INSTREQ) invoke message to the SCP to request call processing instructions (step 214).

In the scenario being described, the SCP sends an SRFDirective (SRFDIR) invoke message to the MSC with an AnnouncementList (ANNLIST) parameter indicating an announcement to play (step 216) based on certain circumstances. Next, the MSC plays the announcement indicated by the ANNLIST parameter to a voice trunk associated with the incoming call (step 218). The voice trunk is associated with the incoming call through a switching module within the MSC. The switching module may provide a suitable connection in a variety of ways depending, for example, on the configuration and/or allocation of channels in the switching module. The announcement ultimately reaches the MS via the voice trunk. After the announcement is played, the MSC sends an srfdirective (srfdir) return result message to the SCP indicating that a response to SRFDIR is complete (step 220). Next, the SCP sends an instructionrequest (instreq) return result message to the MSC indicating that a response to INSTREQ is complete (step 222). When the call leg is terminated, the MSC releases the call and any SRF resources allocated to the call (step 224).

More particularly, the MSC stores information about the received SIEZERES invoke message in step 204. A data structure (e.g., mobile call register) is used to save the value of PLIND and transaction capabilities application part (TCAP) information carried by the SIEZERES invoke message. The TCAP information is needed for continuing communications between the MSC and SCP for this transaction (e.g., sending the seizeres return result message, sending the INSTREQ invoke message).

In step 206, the MSC marks the TLDN allocation indicating that the allocation was for the purpose of performing SRF in response to a request from the SCP. The MSC also sets the data structure containing information about the received SEIZERES invoke message to a state of waiting for an incoming call to the allocated TLDN. Additionally, the MSC sets a timer for the data structure. If the timer expires before an incoming call is received to the allocated TLDN, the MSC releases the data structure.

In step 212, if the incoming call was received to an allocated TLDN, but the allocation was for a non-SRF purpose, the MSC follows appropriate standard strategies for handing incoming calls for the applicable purpose. Moreover, in step 212, if the incoming call was received to the allocated TLDN for an SRF purpose (as in the scenario being described), the incoming call is accepted and a voice trunk connection is established between the MS and the MSC performing the SRF. Next, the MSC finds the data structure that is in the state of waiting for an incoming call to the allocated TLDN and stops the timer associated with the data structure. The MSC saves information about the incoming call into the data structure and retrieves the current TCAP transaction information from the data structure.

The MSC uses the information saved in the data structure to send the INSTREQ invoke message to the SCP in step 214. The MSC keeps a record that the data structure is reserved for the current TCAP transaction with the SCP. Additionally, after sending the INSTREQ invoke message, the MSC sets the data structure to a state of waiting for an SRFDIR invoke message or an instreq return result message from the SCP. The MSC also sets a timer associated with the waiting state. If the timer expires before an SRFDIR or an instreq is received, the MSC releases the resources for the call (e.g., the voice trunk and the data structure).

After receiving the SRFDIR invoke message in step 216, the MSC finds the data structure for the current TCAP transaction that is waiting for an SRFDIR and stops the associated timer. In step 218, based on the information stored in the data structure, the MSC plays announcements to the incoming voice trunk. The announcements played are based on the announcement codes in the ANNLIST parameter received with the SRFDIR invoke message.

In step 220, the MSC sends the srfdir return result message to the SCP by using the current TCAP transaction information saved in the data structure. All SRFDIR messages sent since the last seizeres return result message are handled in the current TCAP transaction. The current TCAP transaction does not necessarily end when the MSC sends the srfdir return result message in step 220. In other words, the current TCAP transaction addresses all messages sent by the MSC that provide SRFs until the MSC receives the instreq return result message in step 222. Accordingly, after the MSC sends the srfdir return result message in step 220, the MSC sets the data structure to a state of waiting for another SRFDIR invoke message or the instreq return result message. The MSC also sets a timer for the data structure associated with the waiting state. If the timer expires before an SRFDIR or an instreq is received, the MSC releases the resources for this call (e.g., the voice trunk and the data structure).

After receiving the instreq return result message in step 222, the MSC finds the data structure for the current TCAP transaction. The data structure is in the state of waiting for an SRFDIR or an instreq. The MSC stops the timer associated with the data structure. Based on the information about the incoming call stored in the data structure, the MSC releases the resources for the call (e.g., the voice trunk and the data structure). The call is finished and the current TCAP transaction with the SCP is also finished The "Play Announcement" scenario described in reference to FIG. 4 may be used in any operational scenario for a wireless network that requires an SRF. For example, operational scenario 8.X.3 (MS Call Origination: Calling Party Disconnect) described in IS-826, which is incorporated herein by reference, and operational scenarios 8.S.6 (Called Party No-Answer Enhanced Preferred Language (EPL) Announcement), 8.S.7 (MS-to-MS Call: Called Party Busy EPL Announcement), 8.V.1 (Freephone Call Origination with Optional Announcement), and 8.V.2 (Freephone Call Origination with Access Denied) described in IS-848, which are incorporated herein by reference. Note that IS-826 applies to WIN capabilities for pre-paid charging. Also note that IS-848 applies to WIN capabilities for enhanced charging services.

Figure 5:
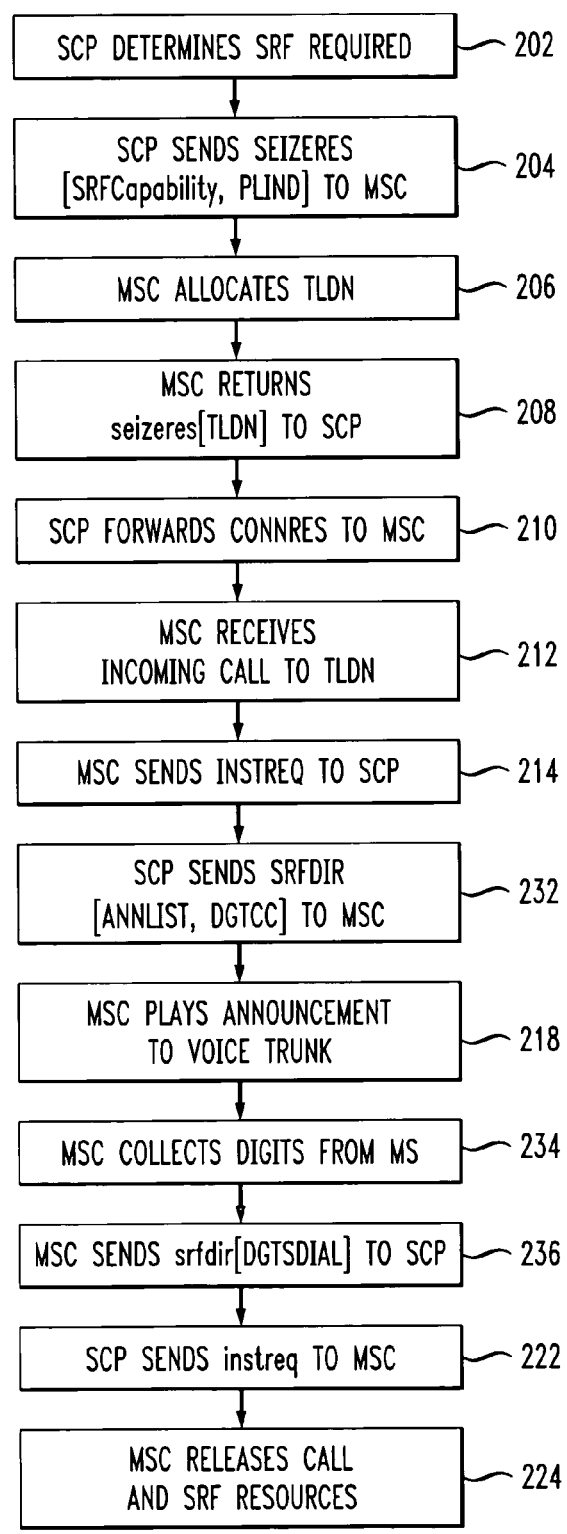
FIG. 5 is a call flowchart of an exemplary SRF scenario ("Play Announcement and Collect Digits") provided in an embodiment of the invention.

With reference to FIG. 5, a call flow of another exemplary SRF scenario ("Play Announcement and Collect Digits") 230 is similar to the scenario described above in reference to FIG. 4. In fact, steps 202 through 214 are the same as described above. In the scenario being described, the SCP sends an SRFDIR invoke message to the MSC with ANNLIST and DGTCC (digit collection) parameters (step 232) based on certain circumstances. Next, the MSC plays the announcement indicated by the ANNLIST parameter to a voice trunk associated with the incoming call (step 218). The announcement ultimately reaches the MS via the voice trunk. After the announcement is played, the digits that are entered by a mobile user in response to the announcement (e.g., voice prompt) are collected by the MSC (step 234). After the MSC finishes collecting digits, the MSC sends an srfdir return result message to the SCP, including the DGTSDIAL parameter, indicating that a response to SRFDIR is complete (step 236). Next, the SCP sends an instreq return result message to the MSC indicating that a response to INSTREQ is complete (step 222). When the call leg is terminated, the MSC releases the call and any SRF resources allocated to the call (step 224).

Revisiting FIG. 5 in more detail, after receiving SRFDIR invoke message in step 232, the MSC finds the data structure for the current TCAP transaction that is waiting for an SRFDIR and stops the associated timer. In step 218, based on the information stored in the data structure, the MSC plays announcements to the incoming voice trunk and collect digits that a user enters in response to the announcements. The announcements played are based on the announcement codes in the ANNLIST parameter received with the SRFDIR invoke message. The announcement, for example, usually prompts the user to enter digits (e.g. password, menu selections). Digit collection is performed based on the DGTCC parameter in the SRFDIR invoke message (e.g., maximum digits allowed to collect, minimum digits to collect, maximum allowed time interval, maximum allowed time gap between digits entered, etc.).

In step 236, the MSC sends the srfdir return result message to the SCP by using the current TCAP transaction information saved in the data structure. All SRFDIR messages sent since the last seizeres return result message are handled in the current TCAP transaction. The current TCAP transaction does not necessarily end when the MSC sends the srfdir return result message in step 236. In other words, the current TCAP transaction addresses all messages sent by the MSC that provide SRFs until the MSC receives the instreq return result message in step 222. Accordingly, after the MSC sends the srfdir return result message in step 236, the MSC sets the data structure to a state of waiting for another SRFDIR invoke message or the instreq return result message. The MSC also sets a timer for the data structure associated with the waiting state. If the timer expires before an SRFDIR or an instreq is received, the MSC releases the resources for this call (e.g., the voice trunk and the data structure).

After receiving the instreq return result message in step 222, the MSC finds the data structure for the current TCAP transaction. The data structure is in the state of waiting for an SRFDIR or an instreq. The MSC stops the timer associated with the data structure. Based on the information about incoming call stored in the data structure, the MSC releases the resources for the call (e.g., the voice trunk and the data structure). The call is finished and the current TCAP transaction with the SCP is also finished The "Play Announcement and Collect Digits" scenario described in reference to FIG. 5 may be used in any operational scenario for a wireless network that requires an SRF. For example, operational scenario 8.3.8.1 (Incoming Call Screening (ICS) with Password Call Acceptance (HLR-based Service Interaction Management (SIM)), 8.3.8.2 (ICS with Password Call Acceptance (SCP-based SIM), and 8.7.1 (IP Interface Message Flow) described in Chapter 4 of IS-771, which are incorporated by reference above. Note that IS-771, Chapter 4, Section 8 applies to voice controlled services in a WIN.

With reference to FIG. 6, call flow of yet another exemplary SRF scenario ("Play Variable Announcement According to Script") 240 is also similar to the scenario described above in reference to FIG. 4. In fact, steps 202 through 214 are the same as described above. In the scenario being described, the SCP sends an SRFDIR invoke message to the MSC with an ExecuteScript (EXESCR) parameter (step 242) based on certain circumstances. Next, the MSC plays a variable announcement indicated by the EXESCR parameter to a voice trunk associated with the incoming call (step 244). The announcement ultimately reaches the MS via the voice trunk. The variable announcement includes an announcement template and one or more variables defined by a script corresponding to the EXESCR parameter. The current values for the variables are inserted into the announcement template when the announcement is played. After the announcement is played, the MSC sends an srfdir return result message to the SCP, including a ScriptResult (SCRRESULT), indicating that a response to SRFDIR is complete (step 246). Next, the SCP sends an instreq return result message to the MSC indicating that a response to INSTREQ is complete (step 222). When the call leg is terminated, the MSC releases the call and any SRF resources allocated to the call (step 224).

Revisiting FIG. 6 in more detail, after receiving the SRFDIR invoke message in step 242, the MSC finds the data structure for the current TCAP transaction that is waiting for an SRFDIR and stops the associated timer. In step 244, based on the information stored in the data structure, the MSC plays the announcement to the incoming voice trunk. The announcement played is a variable announcement based on the EXESCR parameter with customer-defined content.

In step 246, the MSC sends the srfdir return result message to the SCP by using the current TCAP transaction information saved in the data structure. All SRFDIR messages sent since the last seizeres return result message are handled in the current TCAP transaction. The current TCAP transaction does not necessarily end when the MSC sends the srfdir return result message in step 246. In other words, the current TCAP transaction addresses all messages sent by the MSC that provide SRFs until the MSC receives the instreq return result message in step 222. Accordingly, after the MSC sends the srfdir return result message in step 246, the MSC sets the data structure to a state of waiting for another SRFDIR invoke message or the instreq return result message. The MSC also sets a timer for the data structure associated with the waiting state. If the timer expires before an SRFDIR or an instreq is received, the MSC releases the resources for this call (e.g., the voice trunk and the data structure).

After receiving the instreq return result message in step 222, the MSC finds the data structure for the current TCAP transaction. The data structure is in the state of waiting for an SRFDIR or an instreq. The MSC stops the timer associated with the data structure. Based on the information about incoming call stored in the data structure, the MSC releases the resources for the call (e.g., the voice trunk and the data structure). The call is finished and the current TCAP transaction with the SCP is also finished The "Play Variable Announcement According to Script" scenario described in reference to FIG. 6 may be used in any operational scenario for a wireless network that requires an SRF. For example, operational scenario 8.7.1 (IP Interface Message Flow) described in Chapter 4 of IS-771, which is incorporated by reference above, and 8.X.5 (MS Call Origination: Called Party Disconnect), 8.X.10 (Three-Way Calling: Calling Party Disconnect), 8.X.11 (Three-Way Calling: Called Party Disconnect), and 8.X.16 (MS Call Origination with Abbreviated Dialing) described in IS-826, which are incorporated herein by reference. Note that IS-771, Chapter 4, Section 8 applies to voice controlled services in a WIN. Also note that IS-826 applies to WIN capabilities for pre-paid charging.

FIGS. 4, 5, and 6 are scenarios for different types of SRFDIR invoke messages from the SCP (i.e., "Play Announcement," "Play Announcement and Collect Digits," and "Play Variable Announcement According to Script"). The invention also handles other types of SRFDIR invoke messages. For example, a "Play Variable Announcement and Collect Digits" scenario is handled by the invention when the SRFDIR invoke message described above for the "Play Variable Announcement" scenario (FIG. 6) also includes the DGTCC parameter in the SRFDIR invoke message. As shown, the SCP decides which type of SRFDIR invoke message to send and which announcement code to include in the SRFDIR parameters. Even though the scenarios are discussed independently, the SCP can send another SRFDIR before an instreq return result message. Therefore, there are many alternate scenarios that can be created from the three types of SRFDIR invoke messages. For example, the same SRFDIR invoke message can be repeated multiple times with or without changing the announcement code. Additionally, any combination of the various types of SRFDIR invoke message can be provided during the same TCAP transaction (i.e., before an instreq return result message ends the current TCAP transaction).

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for handling specialized resource functions (SRFs) associated with wireless intelligent network (WIN) in a mobile switching center (MSC) of a wireless network, the method including the steps:
   a) providing a service control point (SCP) associated with the MSC;
   b) in the SCP, determining that an SRF is required;
   c) in the SCP, sending a seize resource (SEIZERES) invoke message to the MSC; and
   d) in the MSC, allocating a temporary local directory number (TLDN) for providing the SRF and sending a seize resource (seizeres) return result message to the SCP.

2. The method as set forth in claim 1, further including:
   e) in the MSC, receiving an incoming call to the allocated TLDN and sending an instruction request (INSTREQ) invoke message to the SCP.

3. The method as set forth in claim 2, further including:
   f) in the SCP, sending a first SRF directive (SRFDIR) invoke message to the MSC; and
   g) in the MSC, responding to the first SRFDIR invoke message by communicating a first announcement to a voice trunk associated with the incoming call and sending a first srf directive (srfdir) return result message to the SCP.

4. The method as set forth in claim 3, wherein the first SRFDIR invoke message directs the MSC to perform a play announcement scenario and in response the MSC plays the announcement.

5. The method as set forth in claim 3, wherein the first SRFDIR invoke message directs the MSC to perform a play announcement and collect digits scenario, in response the MSC plays the first announcement and collects digits returned based on the played announcement, and the srfdir return result message to the SCP includes the collected digits.

6. The method as set forth in claim 3, wherein the first SRFDIR invoke message directs the MSC to perform a play variable announcement according to script scenario, in response the MSC plays the first announcement based on a script identifying an announcement template and one or more variables, wherein the played announcement includes the announcement template and the current value of the one or more variables.

7. The method as set forth in claim 3, further including:
   h) in the SCP, sending an instruction request (instreq) return result message to the MSC; and
   i) in the MSC, releasing the call and the allocated SRF resources.

8. The method as set forth in claim 3, further including:

h) in the SCP, sending a second SRFDIR invoke message to the MSC; and i) in the MSC, responding to the second SRFDIR invoke message by communicating a second announcement to the voice trunk associated with the incoming call and sending a second srfdir return result message to the SCP.

9. The method as set forth in claim 8, further including:

j) in the SCP, sending an instreq return result message to the MSC; and k) in the MSC, releasing the call and the allocated SRF resources.

10. A method for handling specialized resource functions (SRFs) in a mobile switching center (MSC) of a wireless network, wherein the wireless network includes the MSC and a service control point (SCP) in communication with the MSC, the method including the steps:

a) determining that an SRF is required;

b) sending a seize resource (SEIZERES) invoke message from the SCP to the MSC;

c) allocating a temporary local directory number (TLDN) in the MSC for providing the SRF; and d) sending a seize resource (seizeres) return result message from the MSC to the SCP.

11. The method as set forth in claim 10, further including:

e) receiving an incoming call at the MSC to the allocated TLDN; and f) sending an instruction request (INSTREQ) invoke message from the MSC to the SCP.

12. The method as set forth in claim 11, further including:

g) sending an SRF directive (SRFDIR) invoke message from the SCP to the MSC; and h) communicating an announcement from the MSC to a voice trunk associated with the incoming call; and i) sending a first srf directive (srfdir) return result message from the MSC to the SCP.

13. The method as set forth in claim 12, further including:

j) sending an instruction request (instreq) return result message from the SCP to the MSC; and k) releasing the call and the allocated SRF resources in the MSC.

\* \* \* \* \*